US011406902B1

(12) United States Patent
Koch

(10) Patent No.: US 11,406,902 B1
(45) Date of Patent: Aug. 9, 2022

(54) SYSTEMS AND METHODS FOR SHARING BENEFITS IN AFFILIATIONS OF GAME PLAYERS

(71) Applicant: Mythical, Inc., Sherman Oaks, CA (US)

(72) Inventor: Rudy Koch, Seattle, WA (US)

(73) Assignee: Mythical, Inc., Sherman Oaks, CA (US)

(*) Notice: Subject to any disclaimer, the term of this patent is extended or adjusted under 35 U.S.C. 154(b) by 146 days.

(21) Appl. No.: 15/929,466

(22) Filed: May 4, 2020

(51) Int. Cl.
*A63F 13/00* (2014.01)
*A63F 13/30* (2014.01)
*A63F 13/79* (2014.01)
*A63F 13/65* (2014.01)
*H04L 9/06* (2006.01)
*H04L 9/00* (2022.01)

(52) U.S. Cl.
CPC .............. *A63F 13/79* (2014.09); *A63F 13/65* (2014.09); *H04L 9/0637* (2013.01); *H04L 9/0643* (2013.01); *H04L 9/50* (2022.05)

(58) Field of Classification Search
CPC ........ A63F 13/69; A63F 13/79; A63F 13/822; A63F 13/85; A63F 2300/57; A63F 2300/575; G07F 17/3281; G06Q 20/123; G06Q 20/36; G06Q 20/38215; G06Q 20/401; G06Q 30/06; H04L 9/0637; H04L 9/3236; H04L 2209/38; H04L 2209/56
See application file for complete search history.

(56) References Cited

U.S. PATENT DOCUMENTS

| | | | |
|---|---|---|---|
| 9,452,356 B1* | 9/2016 | Tsao | A63F 13/87 |
| 10,765,948 B2 | 9/2020 | Eatedali | |
| 11,179,638 B1 | 11/2021 | Linden | |
| 11,179,640 B1 | 11/2021 | Koch | |
| 11,192,036 B1 | 12/2021 | Koch | |
| 2005/0137015 A1 | 6/2005 | Rogers | |
| 2006/0100006 A1 | 5/2006 | Mitchell | |
| 2006/0190392 A1 | 8/2006 | Samid | |

(Continued)

FOREIGN PATENT DOCUMENTS

WO 2020247002 12/2020

OTHER PUBLICATIONS

RockstarFlipper, "Ebay for Beginners, Episode #5. Top Rated Seller & Feedback"—(https://www.youtube.com/watch?v=6tk9sZ95ZW8), Mar. 19, 2017 (Year: 2017).

(Continued)

*Primary Examiner* — Lawrence S Galka
(74) *Attorney, Agent, or Firm* — Esplin & Associates, PC

(57) ABSTRACT

Systems and methods for sharing benefits in affiliations of users of an online gaming platform are disclosed. Exemplary implementations may: store information that includes affiliations of users of an online gaming platform; create an asset that represents a beneficiary right to at least part of a benefit; record ownership of the asset as being owned by the first user; distribute a first portion of the benefit to the first user, responsive to a verification that the first user owns the asset; transfer the ownership of the asset to a second user; record the ownership of the asset as being owned by the second user; and distribute a second portion of the benefit to the second user, responsive to a second verification that the second user owns the asset.

14 Claims, 4 Drawing Sheets

(56) References Cited

U.S. PATENT DOCUMENTS

| | | |
|---|---|---|
| 2007/0087831 A1 | 4/2007 | Van Luchene |
| 2007/0099685 A1 | 5/2007 | Van Luchene |
| 2007/0202951 A1 | 8/2007 | Bogosian |
| 2009/0318221 A1* | 12/2009 | Dhunjishaw ........... G06Q 20/04 463/29 |
| 2009/0325690 A1 | 12/2009 | Zhou |
| 2010/0205430 A1 | 8/2010 | Chiou |
| 2011/0183749 A1 | 7/2011 | Allen |
| 2011/0312424 A1 | 12/2011 | Burckart |
| 2013/0172086 A1 | 7/2013 | Ikenaga |
| 2014/0011595 A1 | 1/2014 | Muller |
| 2014/0162781 A1 | 6/2014 | Butler |
| 2015/0170112 A1 | 6/2015 | Decastro |
| 2015/0224409 A1 | 8/2015 | Hayashida |
| 2015/0375103 A1 | 12/2015 | George |
| 2016/0005270 A1 | 1/2016 | Marr |
| 2016/0292680 A1 | 10/2016 | Wilson, Jr. |
| 2017/0095741 A1 | 4/2017 | Perry |
| 2018/0178125 A1 | 6/2018 | Perry |
| 2019/0354945 A1 | 11/2019 | Mahajan |
| 2020/0090143 A1 | 3/2020 | Iervolino |
| 2020/0202668 A1* | 6/2020 | Cotta ...................... A63F 13/70 |
| 2020/0294133 A1 | 9/2020 | Cella |
| 2020/0311721 A1 | 10/2020 | Ow |
| 2020/0320623 A1 | 10/2020 | McGrath |
| 2021/0052981 A1 | 2/2021 | Min |
| 2021/0106920 A1 | 4/2021 | Lim |

OTHER PUBLICATIONS

Wood, Mike, "How to Leave Feedback on Ebay",—(https://www.youtube.com/watch?v=EIY1uTuAixA), May 25, 2017 (Year: 2017).

Wood, Mike, "How to Leave Feedback on Ebay"—(https://www.youtube.com/watch?v=EIYiuTuAixA),May 25, 2017 (Year: 2017).

\* cited by examiner

SYSTEMS AND METHODS FOR SHARING BENEFITS IN AFFILIATIONS OF GAME PLAYERS

FIELD OF THE DISCLOSURE

The present disclosure relates to systems and methods for sharing benefits in affiliations of users of an online gaming platform.

BACKGROUND

Online gaming platforms are known. Collaboration among different users in a game is known. Selling digital in-game assets to the users of online gaming platforms is known.

SUMMARY

One aspect of the present disclosure relates to a system configured to share benefits in affiliations of users of an online gaming platform. The system may include electronic storage, one or more hardware processors, and/or other components. The electronic storage may be configured to electronically store information. The information may include the affiliations of the users of the online gaming platform. The affiliations may include a first affiliation. The first affiliation may have a membership including a set of members that have voluntarily elected to be included in the membership. Inclusion in the membership may persist beyond logging out of and into the online gaming platform. The set of members may include a first user. Inclusion in the membership may confer a beneficiary right to at least part of a benefit for a subset of the members. The benefit may include a first portion and a second portion. The one or more hardware processors may be configured by machine-readable instructions. The one or more hardware processors may create an asset that represents the beneficiary right. The one or more hardware processors may record ownership of the asset as being owned by the first user. The one or more hardware processors may distribute the first portion of the benefit to the first user, responsive to a verification that the first user owns the asset. The one or more hardware processors may transfer the ownership of the asset to a second user. The one or more hardware processors may record the ownership of the asset as being owned by the second user. The one or more hardware processors may distribute the second portion of the benefit to the second user, responsive to a second verification that the second user owns the asset.

Another aspect of the present disclosure relates to a method for sharing benefits in affiliations of users of an online gaming platform. The method may include storing, in electronic storage, the affiliations of the users of the online gaming platform. The affiliations may include a first affiliation. The first affiliation may have a membership including a set of members that have voluntarily elected to be included in the membership. Inclusion in the membership may persist beyond logging out of and into the online gaming platform. The set of members may include a first user. Inclusion in the membership may confer a beneficiary right to at least part of a benefit for a subset of the members. The benefit may include a first portion and a second portion. The method may include creating an asset that represents the beneficiary right. The method may include recording ownership of the asset as being owned by the first user. The method may include distributing the first portion of the benefit to the first user, responsive to a verification that the first user owns the asset. The method may include transferring the ownership of the asset to a second user. The method may include recording the ownership of the asset as being owned by the second user. The method may include distributing the second portion of the benefit to the second user, responsive to a second verification that the second user owns the asset.

As used herein, any association (or relation, or reflection, or indication, or correspondency) involving servers, processors, client computing platforms, assets, rights, affiliations, members, benefits, ownership, instructions, operations, distributions, invitations, acceptances, inclusions, requests, verifications, presentations, sales, transfers, notifications, blockchains, approvals, denials, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
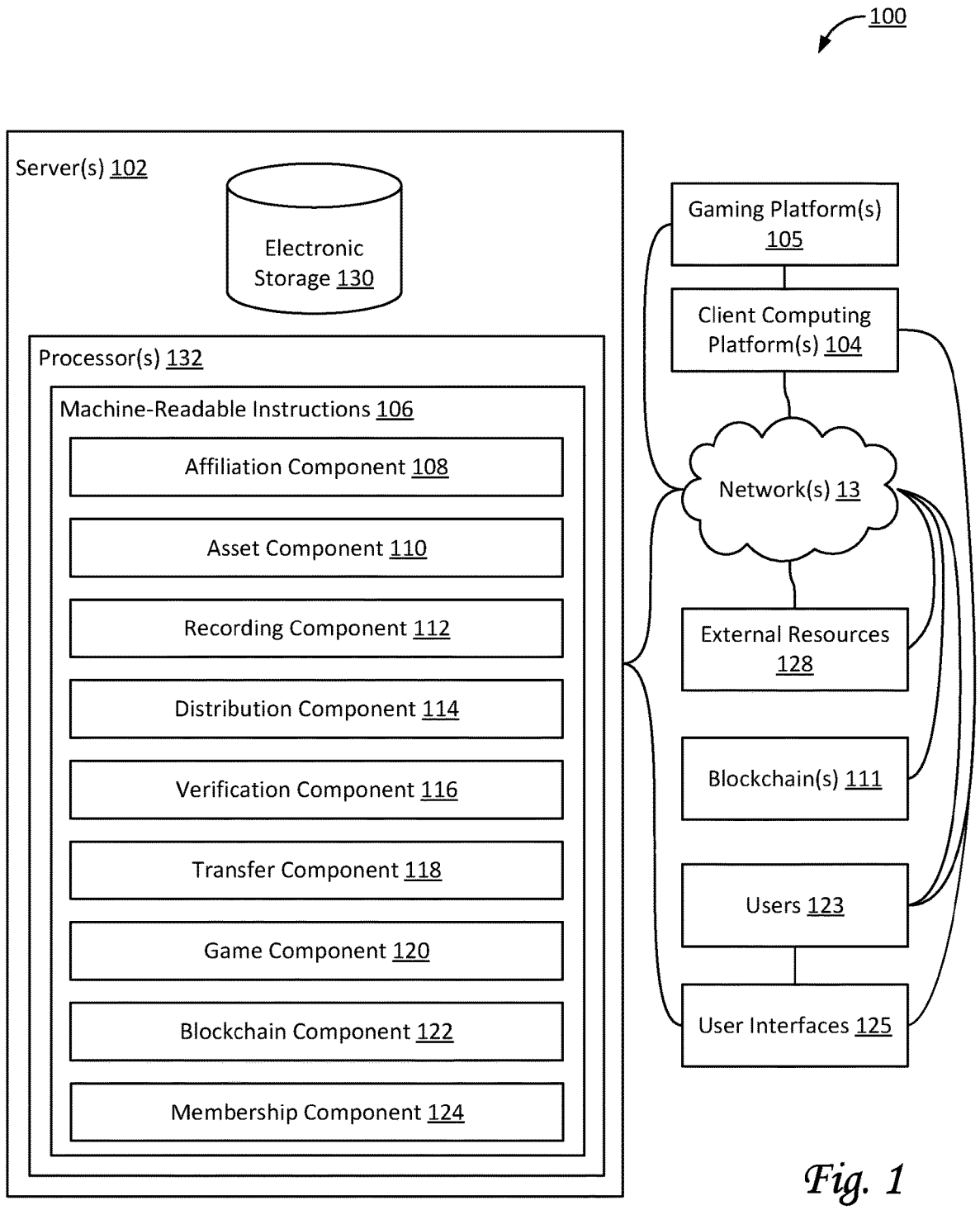
FIG. 1 illustrates a system configured for sharing benefits in affiliations of users of an online gaming platform, in accordance with one or more implementations.

FIG. 1 illustrates a system 100 configured for sharing benefits in affiliations of users of one or more gaming platforms 105 (e.g., an online gaming platform), in accordance with one or more implementations. In some implementations, system 100 may include one or more of electronic storage 130, one or more servers 102, one or more client computing platforms 104, one or more gaming platforms 105, one or more blockchains 111, one or more external resources 128, and/or other components.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 123 may access system 100 via client computing platform(s) 104. Users 123 (also referred to as players) may include one or more of a first user, a second user, a third user, a fourth user, and/or other users.

In some implementations, system 100 and/or servers 102 may be configured to communicate with one or more of (online) gaming platform(s) 105, users 123, blockchain(s) 111, and/or other components. As used herein, gaming platform 105 may refer to either an individual game, a type of gaming console and its ecosystem, and/or both. Gaming platform 105 may be operated, hosted, and/or owned by a stakeholder of gaming platform 105. Users 123 may include players who play on gaming platform 105. In some implementations, gaming platform 105 may include an online store that sells and/or otherwise transfers (in-game) virtual items that may be used within gaming platform 105. In some implementations, gaming platform 105 may support an exchange and/or marketplace for users 123 such that different users can sell, purchase, trade, and/or otherwise exchange (in-game) virtual items (including the types of assets described in this disclosure) that may be used within gaming platform 105 and/or may be useful within gaming platform 105. In some implementations, users can sell, purchase, trade, and/or otherwise exchange (in-game) virtual items through (external) online sales platforms, including but not limited to eBay™.

As used herein, affiliations are groups of users that have certain interests, characteristics, and/or responsibilities in common. In individual affiliation may have a membership including a set of users (also referred to as members). In some implementations, for a given affiliation, individual members are either founding members (who started the given affiliation) or users who have voluntarily elected to be members of the given affiliation (e.g., by accepting an invitation to join the given affiliation). In some implementations, inclusion in the membership of a given affiliation may have semi-permanence, e.g., it may persist beyond a current session of activity on gaming platform 105, beyond logging out of and logging in to gaming platform 105, beyond a current assignment/challenge/mission/level/battle/war within gaming platform 105, and beyond other types of temporary and/or random connections between users, including but not limited to ad hoc connections between users. For example, in some implementations, just because a user is battling the same boss in a challenge within a game as another user does not mean both users are in the same affiliation. For example, in some implementations, just because a user has a connection and/or has friended another user in a social network does not mean both users are in the same affiliation. In some implementations, membership of a given affiliation may have a duration of at least a day, a week, a month, 2 months, 3 months, 6 months, a year, between 1 month and 6 months, between 3 months and 1 year, and/or other durations. In some implementations, a given affiliation may be organized such that the set of members of the given affiliation form an alliance within gaming platform 105. For example, in some implementations, an alliance may enable one or more type of collaboration that are not available between different users that are not members of the same alliance/affiliation. For example, two members may choose to share gaming content, virtual items, skills and/or abilities with each other in ways that unaffiliated members cannot. For example, alliance members may use an exclusive alliance-owned means of transportation. For example, in some implementations, a given affiliation may be organized such that the set of members of the given affiliation form a guild within gaming platform 105. For example, in some implementations, a guild may represent and/or promote shared interests of its members (e.g., the guild of space lawyers of intergalactic patent law vis-h-vis equitable spice distribution).

Membership of a given affiliation may have one or more benefits, including but not limited to one or more types of benefits. In some implementations, benefits may include one or more of goods, services, access, content, and/or other (potentially) useful objects/things within gaming platform 105. In some implementations, a benefit may include a right to do or use something within gaming platform 105. In some implementations, each individual member may have the same benefits as any other member (e.g., the same benefit may be distributed to all members in the given affiliation). In some implementations, some members may have (or receive, or be distributed) different benefits than other members. For example, the various benefits may be organized in different tiers. For example, a first-tier member may have a first set of benefits, a second-tier member may have a second set of benefits that is different from the first set of benefits, and so forth for further tiers. In some implementations, a particular type of benefit may be provided and/or distributed to members individually. In some implementations, a particular type of benefit may be provided and/or distributed to multiple (if not all) members jointly. For example, in some implementations, a benefit may be a (proportional) share of earnings, profit, and/or gain that was earned, awarded, bestowed, won, stolen, and/or otherwise obtained by the given affiliation. In some implementations, a benefit may include one or more portions. For example, distribution of an individual portion of a benefit may be triggered by predetermined events, including but not limited to in-game events. For example, a portion of profit-sharing benefit may be triggered by regularly timed intervals, such as every month, every 3 months, every year, and/or other intervals. For example, a portion of loot-sharing benefit may be triggered by a victory in a battle, the defeat of an enemy (or adversary affiliation), and/or other occurrences of predetermined and/or predefined events within online gaming platform 105. For example, a portion of earnings-sharing benefit may be triggered by an accumulation of earnings (e.g., for a given affiliation) that exceeds a predetermined earnings threshold.

In some implementations, system 100 may include a (distributed) blockchain that may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts and/or other executable code. In some implementations, the distributed computing platform may include electronic storage configured to store part or all of blockchain(s) 111. The smart contracts may be stored on blockchain(s) 111. In some implementations, the distributed computing platform may be the EOSIO platform. In some implementations, the distributed computing platform may be Ethereum. In some implementations, the distributed computing platform may be similar to Ethereum. In some implementations, the virtual machine may be a decentralized virtual machine.

A distributed blockchain may act as a (decentralized) database that stores a registry and/or ledger of assets and transactions across one or more networks. In some implementations, a ledger may be implemented as a database. For example, a blockchain is a type of ledger, as well as a type of decentralized database that stores a registry of assets and transactions. A given asset may be owned by a particular user. An asset may include anything of material value or usefulness that is owned by or on behalf of a person or company or an affiliation, including but not limited to assets created by asset component 110, and/or other assets. In some implementations, a right pertaining to an object (e.g., a benefit) may be an asset, the object being a physical or a virtual item. Multiple rights may form a set of rights or a bundle of rights that may be transferred and/or otherwise acted on or operated on together. For example, rights may include one or more of a right to use, a right to sell, a right to destroy, and/or other rights. In some implementations, a right to a benefit may be referred to as a beneficiary right. In some implementations, a right to the distribution of a benefit may be referred to as a beneficiary right.

In some implementations, tokens may be a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform, e.g., in the operation of blockchain 111.

In some implementations, blockchain(s) 111 may record and/or register ownership of assets. Alternatively, and/or simultaneously, blockchain(s) 111 may register transactions that modify ownership of assets. A smart contract may be a type of asset. In some implementations, once a smart contract has been added to a blockchain, the smart contract may be referred to as published, posted, registered, and/or recorded. Elements of blockchain(s) 111 may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information.

In some implementations, blockchain(s) 111 may be publicly accessible and append-only. In some implementations, existing blocks of a distributed blockchain can substantially not be altered or deleted, unless multiple copies of the distributed blockchain are altered. This is unlikely to happen provided that multiple copies of the distributed blockchain are stored on different computing platforms, e.g., in different geographical locations. The distributed blockchain may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that proves integrity and/or prevents tampering, e.g., by providing authentication.

Server(s) 102 may be configured by machine-readable instructions 106. Machine-readable instructions 106 may include one or more instruction components. The instruction components may include computer program components. The instruction components may include one or more of an affiliation component 108, an asset component 110, a recording component 112, a distribution component 114, a verification component 116, a transfer component 118, a game component 120, a blockchain component 122, a membership component 124, and/or other instruction components.

Affiliation component 108 may be configured to store information in electronic storage 130, including but not limited to information defining and/or pertaining to affiliations. In some implementations, affiliation component 108 may be configured to store information in electronic storage 130 that corresponds to affiliations. For example, affiliation component 108 may store, in electronic storage 130, a first affiliation, a second affiliation, a third affiliation, and so forth. The first affiliation may have a membership including a first set of members. The second affiliation may have a second membership including a second set of members, and so forth. In some implementations, a user may be a member of multiple affiliations. In some implementations, membership may be exclusive to a single affiliation. In some implementations, membership may (automatically) confer one or more beneficiary rights to individual members. The one or more beneficiary rights may include rights to at least part of one or more benefits. For example, membership of the first affiliation may confer a first beneficiary right to a first benefit, membership of the second affiliation may confer a second beneficiary right to a second benefit, and so forth. In some implementations, the first benefit may include separate distributions of different portions of the first benefit. For example, the first benefit may include a first portion, a second portion, and so forth. The first portion may be distributed at a first point in time, the second portion may be distributed at a second point in time, and so forth.

Asset component 110 may be configured to create assets. The assets may include a first asset, a second asset, a third asset, and so forth. The assets may represent certain rights, e.g. a set of rights. The rights of a particular asset may include one or more beneficiary rights. For example, ownership of a given asset may correspond to ownership of a given beneficiary right. In some implementations, assets may be managed by online gaming platform 105, blockchain 111, and/or other components of system 100. For example, in some implementations, a given asset may be included in (or accessible through) a user inventory of a user of online gaming platform 105. For example, in some implementations, (ownership of) a given asset may be recorded on (or accessible through) blockchain 111. In some implementations, using the given beneficiary right may require ownership of the given asset. In some implementations, a given asset may represent a given beneficiary right (to a given benefit) that is shared among the members of a given affiliation. Upon distribution of the given benefit, all or some of the members of the given affiliation may receive the given benefit. Additionally, in some implementations, the current owner of the given asset may also receive the given benefit. In some implementations, ownership of the given asset may bestow (at least some of) the same or similar rights and benefits that are shared among the members of the given affiliation. For example, in some implementations, a given member of a given affiliation may sell access to the given affiliation (say, a guild) to another user through the mechanism of selling a given asset. In some implementations, ownership of a given asset may bestow a given benefit (that may be shared among the members of the given affiliation) for a limited duration and/or period. For example, the given benefit may only last and/or be valid for 1 week, 2 weeks, 1 month, 3 months, 6 months, and/or other durations. In some implementations, a seller of such a limited-duration benefit may be deprived of the given benefit for the pertinent duration. In other implementations, the seller and the buyer may both enjoy the limited-duration benefit.

Recording component 112 may be configured to record ownership of assets. For example, ownership may signify a particular relationship between assets and one or more users. In some implementations, ownership may be exclusive, e.g., to one user. For example, a given asset may be recorded as being owned by a first user. In some implementations, recording component 112 may be configured to verify whether a particular players owns a particular (beneficiary) right. In some implementations, recording component 112 may (co)operate with one or more other components of system 100 to record and/or verify ownership of assets on blockchain 111, e.g., by analyzing the history of recorded transactions of a given asset.

Distribution component 114 may be configured to distribute and/or otherwise provide (portions of) benefits to users. In some implementations, distributions by distribution component 114 may be performed responsive to one or more verifications. For example, a particular distribution of (a given portion of) a given benefit may be performed responsive to a verification of the ownership of a given asset that represents the given benefit. In other words, ownership of the given asset may be required for a user to receive the particular distribution. For example, distribution component 114 may distribute a first portion of a first benefit to a first user (note the beneficiary right to the first benefit may be represented by a given asset), responsive to a verification that the first user owns the given asset. Subsequently (at a different point in time), distribution component 114 may distribute a second portion of the first benefit to the current owner of the given asset (this could still be the first user, or it could be a different user).

Figure 3A:
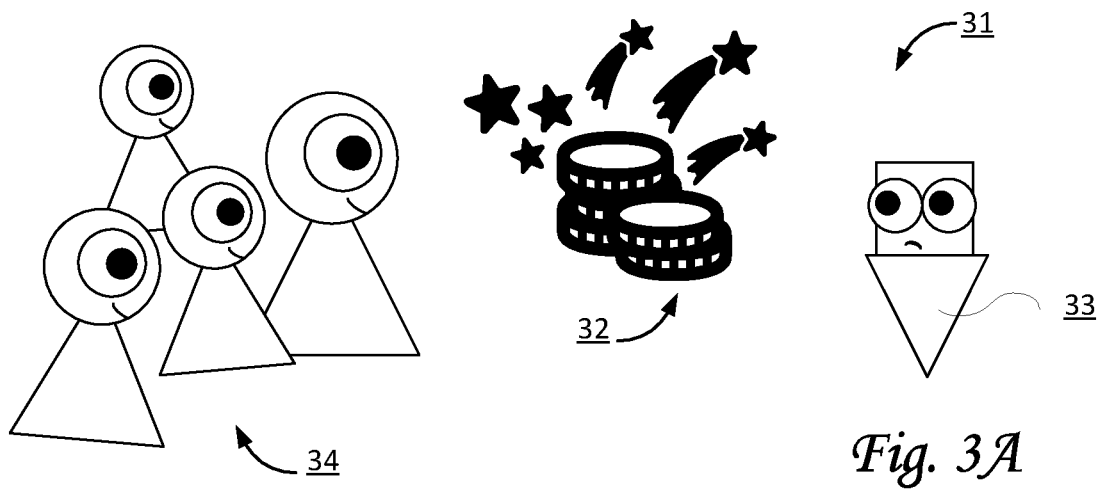
FIGS. 3A-3B-3C illustrate an occurrence of sharing benefits in an affiliation of users of an online gaming platform, as may be used in a system as described, in accordance with one or more implementations.
Figure 3B:
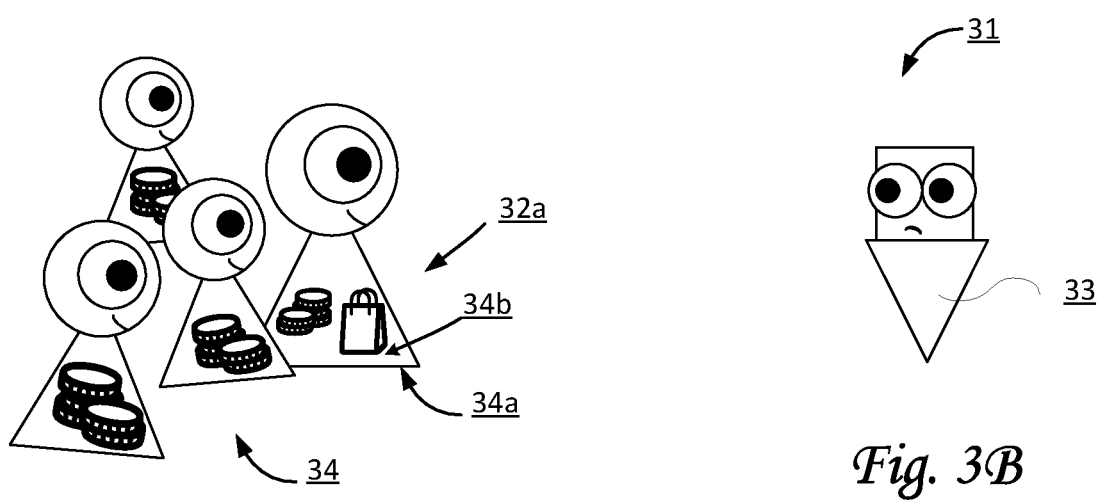
Figure 3C:
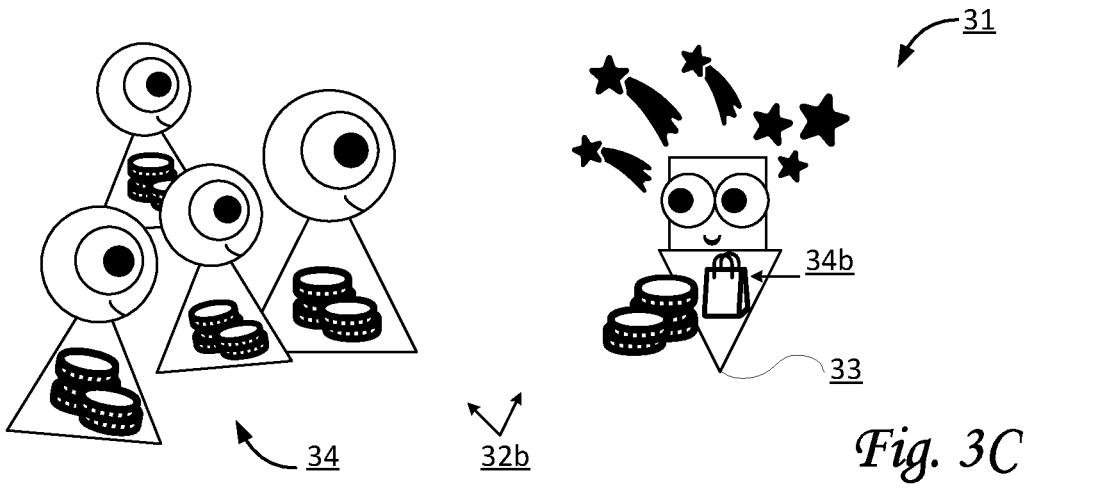

By way of non-limiting example, FIGS. 3A-3B-3C illustrate an occurrence of sequential gameplay that includes sharing benefits in a game played by (user-controlled) in-game character 33 in a topography 31. Event 32 may depict the occurrence of a particular event or trigger within the game, that signifies a particular distribution of coins shall occur among the members of an affiliation 34 (here depicted as having at least 4 members). The given beneficiary right to the particular distribution of coins may be shared among the members of affiliation 34, and furthermore shared with the owner of a given asset (not depicted in FIG. 3A). Subsequently to FIG. 3A, as depicted in FIG. 3B, the members of affiliation 34 individually receive distribution 32a of coins (e.g., these may be earnings by affiliation 34). In-game character 34a is a member of affiliation 34, and also receives distribution 32a of coins. In-game character 33 is not a member of affiliation 34, and consequently receives no distribution of coins. Ownership of the given asset (and therefore the given beneficiary right) may be visually represented by a virtual item 34b. Subsequently to FIG. 3B, during gameplay, in-game character 33 purchases (not depicted) the given asset that represents the given beneficiary asset. As depicted in FIG. 3C, in-game character 33 owns the given asset, as visually represented by virtual item 34b. A subsequent distribution 32b is received by the members of affiliation 34 and in-game character 33 (by virtue of ownership of the given asset).

Referring to FIG. 1, verification component 116 may be configured to perform one or more verifications related to assets, ownership, benefits, and/or other entities used by system 100. For example, a first type of verification may be an ownership verification regarding a particular asset and a particular user, to verify whether the particular user owns the particular asset. For example, a second type of verification may be an ownership verification regarding a particular beneficiary right and a particular user, to verify whether the particular user owns the particular beneficiary right. For example, a third type of verification may be an event verification regarding a particular predetermined (in-game) event or (in-game) trigger, to verify whether the particular predetermined event or trigger occurred. For example, a fourth type of verification may be a trigger verification regarding a particular predefined trigger that triggers a distribution of a (given portion of) a given benefit, to verify whether the distribution should occur. In some implementations, distribution of a particular benefit may require additional conditions to be met, including but not limited to in-game achievements (such as reaching a particular playing level within a game, or playing at least a minimum amount within the game, and/or other individual achievements), collaborative achievements (such as helping, within the game, other members of the same affiliation, or collectively as an affiliation achieving and/or completing some task), hardware restrictions (such as meeting certain requirements with regard to hardware configurations and/or hardware characteristics when interacting with gaming platform 105), and/or other conditions.

Transfer component 118 may be configured to transfer assets between users. In some implementations, transfer component 118 may be configured to transfer ownership of assets, for example from a first user to a second user. In some implementations, transfer component 118 may be configured to modify ownership of a particular asset as previously recorded to reflect a transfer of the particular asset to a new owner. In some implementations, operations by transfer component 118 may occur responsive to a purchase. For example, a second player may purchase a given asset from a first player. Responsive to such a purchase, the given asset may be transferred to the second player by transfer component 118. In some implementations, completion of purchases may include recording of transactions on blockchain 111, for example by recording component 112. In some implementations, the new owner may not need to be a member of the same affiliation as the old owner. For example, a given asset may represent a given beneficiary right to certain distributions of benefits. The given asset may be owned by a first user, a member of a first affiliation. Transfer component 118 may transfer the given asset to a second user who is not a member of the first affiliation. After this transfer (e.g., accomplished through a purchase), the second user owns the given beneficiary right.

Game component 120 may be configured to execute an instance of a game (e.g., an online game within gaming platform 105) to facilitate presentation of the game to users 123, and/or to implement in-game actions in the instance of the game, e.g., in response to action requests for the in-game actions by users 123. The game may be provided via a virtual space, and may include a plurality of resource types and/or maps. An instance of the virtual space may be executed by one or more computer components to determine views of the virtual space. In some implementations, the view may be communicated (e.g., by streaming, via object/position data, and/or other information) from server(s) 102 and/or other sources to client computing platforms 104 for presentation to users 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by a user.

The instance of the virtual space may include a simulated space that is accessible by users 123 by clients (e.g., client computing platforms 104) that present the views of the virtual space to a user. The simulated space may have a topography, express ongoing real-time interaction by one or more users, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the virtual space, users 123 may control characters, objects, simulated physical phenomena, and/or other elements within the virtual space to interact with the virtual space and/or each other. The user characters may include avatars. As used herein, the term "user character" may refer to an object or group of objects present in the virtual space, that correspond(s) to an individual user. A particular user character may be controlled by the particular user with which it is associated. Such user characters may be referred to as user-controlled characters. User-controlled element(s) may move through and interact with the virtual space (e.g., non-user characters in the virtual space, other objects in the virtual space, etc.). User-controlled elements controlled by and/or associated with a given user may be created and/or customized by the given user. Individual users may have an "inventory" of virtual goods and currency (e.g., resources of the plurality of resource types) that the individual user can use (e.g., by manipulation of a user character and/or other user-controlled elements) and/or other items, to perform in-game actions within the virtual space.

Blockchain component 122 may be configured to perform actions on blockchain 111, including but not limited to recording transactions/transfers of assets, recording and/or verifying ownership of assets, recording changes in ownership, analyzing ownership of particular assets (e.g., through the history of recorded transactions), and/or other actions. For example, in some implementations, recording component 112 and/or verification component 116 may use one or more functions provided by blockchain component 122 to perform one or more of the actions and/or features attributed to recording component 112 and/or verification component 116, including but not limited to recording and/or performing verifications, such as, for example, verifications related to ownership of particular assets. For example, in some implementations, assets may be implemented as smart contracts on blockchain 111. A verification of asset-ownership may accordingly be implemented as a function on a particular smart contract. Moreover, a transfer of ownership may be implemented by recording and/or storing an address (that identifies the new owner of a particular asset) to blockchain 111 and/or the particular smart contract.

Figure 4A:
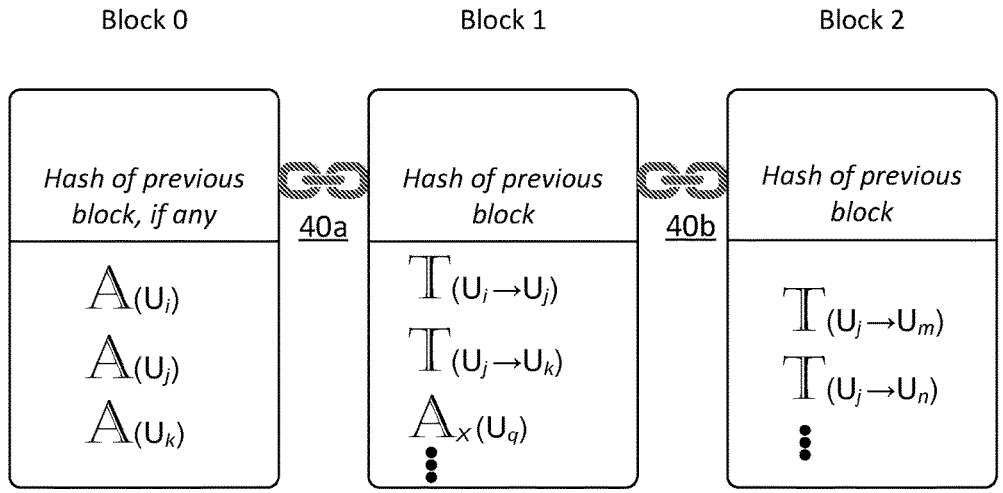
FIGS. 4A-4B illustrate exemplary blockchains as may be used by a system configured for sharing benefits in affiliations of users of an online gaming platform, in accordance with one or more implementations.

By way of non-limiting example, FIG. 4A illustrates a blockchain 111*a* that implements a blockchain including a block 0, a block 1, and a block 2. As time progresses, more blocks may be added to blockchain 111*a*. The blocks within blockchain 111*a* are ordered. As shown in block 0, three assets (indicated by a capital "A") are created and/or generated, and subsequently assigned to three users or players: a first asset is assigned to user i (Ui), a second asset is assigned to user j (Uj), and a third asset is assigned to user k (Uk). As used in the context of blockchains, assignments may be recordations of ownership (also referred to as recordings of ownership). These assets may be individually manifested, deployed, and/or instantiated through an asset component similar to asset component 110 (see FIG. 1). Block 1 is connected to block 0 (as indicated by a link 40*a*), for example, by including an address of block 1 in block 0, or vice versa. Likewise, block 1 is connected to block 2, as indicated by a link 40*b*.

In block 1, one asset (labeled Ax) is assigned to user q (Uq), for example by associating an address of user q to asset Ax. For example, the asset in block 1 may be an individual asset created by an asset component similar to asset component 108 (see FIG. 1). Asset Ax may represent one or more beneficiary rights related to a particular affiliation (e.g., named the "Armament Alliance") of users in a game on gaming platform 105 (not shown in FIG. 4A). Additionally, block 1 includes two transactions (indicated by a capital "T"): a first transaction from user i to user j, and a second transaction from user j to user k. Block 2 includes a first transaction from user j to user m, and a second transaction from user j to user n. In some implementations, based on the contents of the blocks, any user of blockchain 111*a* may determine the current assets of blockchain 111*a*, and the balances of any user. In some implementations, the balance of a particular user may be verified prior to adding a transaction that reduces that particular user's balance. For example, an individual user may not be allowed to transfer assets the individual user does not own.

Figure 4B:
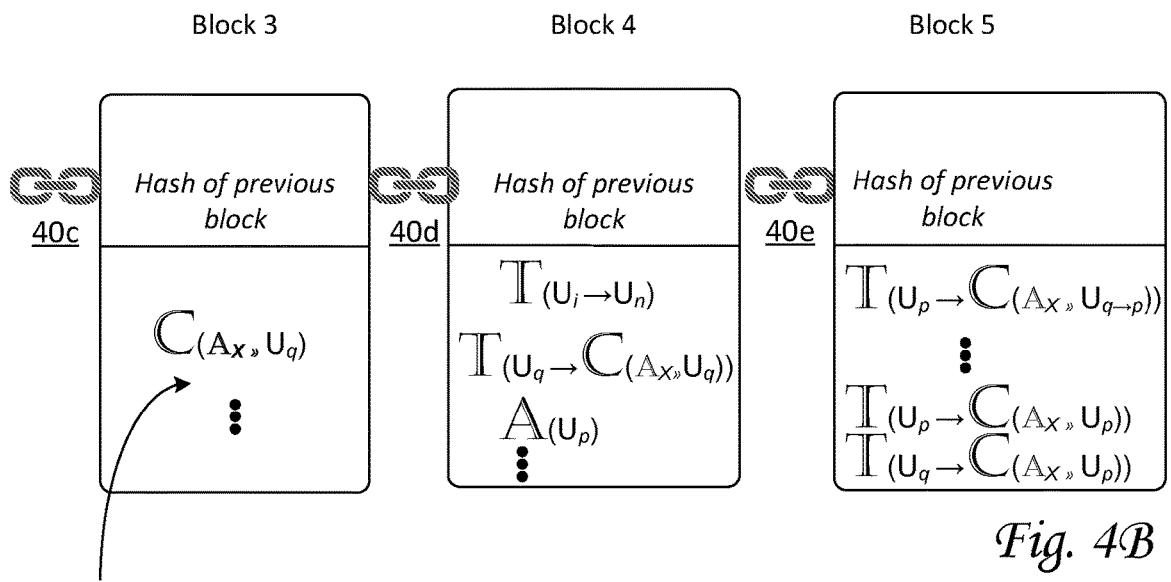

By way of non-limiting example, FIG. 4B illustrates a blockchain 111*b* that includes the same blocks as blockchain 111*a* of FIG. 4A, plus additional blocks (block 3, block 4, block 5) that have been appended to the blockchain. Block 3 may be connected to block 2 (as indicated by a link 40*c*), block 4 may be connected to block 3 (as indicated by a link 40*d*), and block 5 may be connected to block 4 (as indicated by a link 40*e*). In block 3, a smart contract 41 (indicated by a capital "C") is posted. For example, smart contract 41 may have been generated to aid or implement different types of usage of asset Ax (and/or other actions related to asset Ax). In FIG. 4B, a function call to a function defined by smart contract 41 (e.g., to initiate a particular type of usage of asset Ax) may be depicted and/or implemented as a transaction (e.g., the function may be invoked in exchange for consideration). In some implementations, smart contract 41 may have been posted to blockchain 111*b* by (or on behalf of) an owner or creator of asset Ax. In some implementations, smart contract 41 may have been posted by an affiliation, such as the "Armament Alliance". Referring to FIG. 4B, for example, smart contract 41 may include or refer to asset Ax and record that asset Ax is currently owned by user q (Uq). In block 4, one asset is assigned to user p (Up). Additionally, block 4 includes a transaction (indicated by a capital "T"): a transaction from user i to user n. For example, the transaction may represent a purchase of a first virtual item by user n. Additionally, block 4 includes a transaction from user q to the same smart contract as depicted in block 3. For example, the transaction may represent user q (or some other party) initiating a particular distribution of a (first portion of a) benefit to user q (the current owner) in accordance with a beneficiary right represented by asset Ax. Block 5 includes three transactions (indicated by a capital "T"): a first transaction representing a transfer of ownership of asset Ax from old owner user q to new owner user p. A second transaction may represent user p initiating another distribution in accordance with a beneficiary right represented by asset Ax (this distribution should occur since user p is the current owner). A third transaction may represent user q initiating another distribution in accordance with a beneficiary right represented by asset Ax (this distribution should not occur since user q is no longer the current owner).

Referring to FIG. 1, membership component 124 may be configured to modify affiliations, e.g., by adding and/or removing members from affiliations. In some implementations, membership component 124 may be configured to transmit and/or otherwise transfer invitations to join given affiliations to users that are not members of the given affiliations. The invitations may be individually and voluntarily accepted or declined by the users that received the invitations. In some implementations, for example, a first member of a first affiliation may instruct and/or request membership component 124 to transfer a first invitation to a first non-member user, inviting this user to join the first affiliation. In some implementations, for example, the first invitation may be transferred by membership component 124 on behalf of the first member of the first affiliation to the first non-member user, inviting this user to join the first affiliation. In some implementations, membership component 124 may be configured to decline a request to transfer a particular invitation, e.g. because of restrictions and/or requirements regarding such invitations not being met. For example, in some affiliations, only certain members may be allowed to invite non-members to join. In some implementations, membership component 124 may be configured to receive individual responses to the invitations from invited users, to either accept or decline the invitations. In some implementations, membership component 124 may be configured to effectuate inclusion of users that accepted invitations into the given affiliations. For example, the first non-member user may respond with an acceptance to join the first affiliation. Membership component 124 may add this user to the membership of the first affiliation. In some implementations, the modified membership may be stored in electronic storage 130, e.g., by affiliation component 108 and/or by membership component 124.

In some implementations, server(s) 102, client computing platform(s) 104, and/or external resources 128 may be operatively linked via one or more electronic communication links. For example, such electronic communication links may be established, at least in part, via one or more networks 13, including but not limited to the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a smart watch, a gaming console, and/or other computing platforms.

External resources 128 may include sources of information outside of system 100, external entities participating with system 100, and/or other resources. For example, in some implementations, external resources 128 may include an online sales platform through which assets may be purchased and sold between different users. In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, and/or 124, and/or other components. Processor(s) 132 may be configured to execute components 108, 110, 112, 114, 116, 118, 120, 122, and/or 124, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, and/or 124 are illustrated in FIG. 1 as being implemented within a single processing unit, in implementations in which processor(s) 132 includes multiple processing units, one or more of components 108, 110, 112, 114, 116, 118, 120, 122, and/or 124 may be implemented remotely from the other components. The description of the functionality provided by the different components 108, 110, 112, 114, 116, 118, 120, 122, and/or 124 described below is for illustrative purposes, and is not intended to be limiting, as any of components 108, 110, 112, 114, 116, 118, 120, 122, and/or 124 may provide more or less functionality than is described. For example, one or more of components 108, 110, 112, 114, 116, 118, 120, 122, and/or 124 may be eliminated, and some or all of its functionality may be provided by other ones of components 108, 110, 112, 114, 116, 118, 120, 122, and/or 124. As another example, processor(s) 132 may be configured to execute one or more additional components that may perform some or all of the functionality attributed below to one of components 108, 110, 112, 114, 116, 118, 120, 122, and/or 124.

Figure 2:
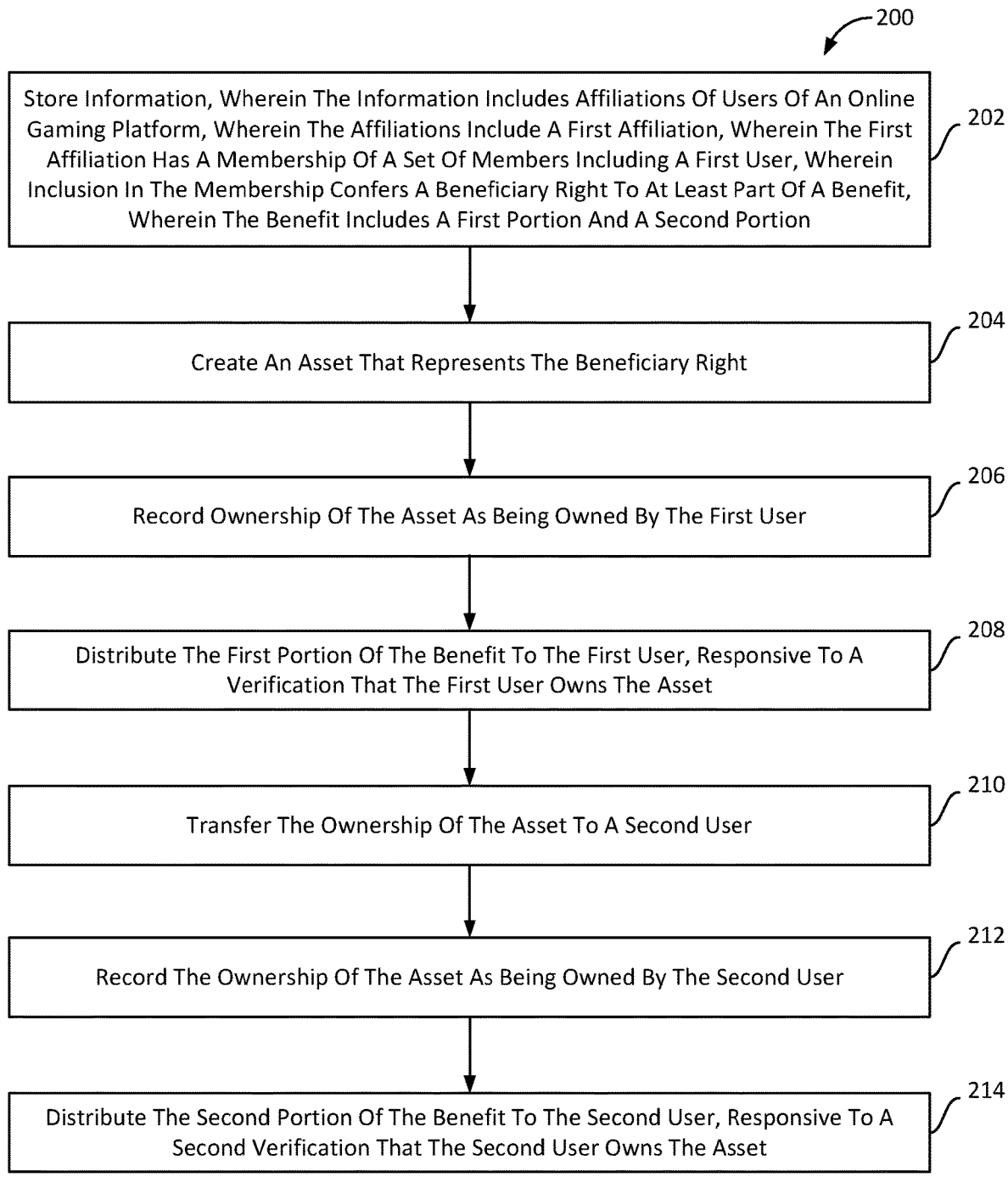
FIG. 2 illustrates a method for sharing benefits in affiliations of users of an online gaming platform, in accordance with one or more implementations.

FIG. 2 illustrates a method 200 for tokenizing moments in a game, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information is stored. The information includes affiliations of users of an online gaming platform. The affiliations include a first affiliation. The first affiliation has a membership of a set of members that have voluntarily elected to be included in the membership. Inclusion in the membership persists beyond logging out of and into the online gaming platform. The set of members includes a first user. Inclusion in the membership confers a beneficiary right to at least part of a benefit for a subset of the members. The benefit includes a first portion and a second portion. In some embodiments, operation 202 is performed by an affiliation component the same as or similar to affiliation component 108 (shown in FIG. 1 and described herein).

At an operation 204, an asset is created that represents the beneficiary right. In some embodiments, operation 204 is performed by an asset component the same as or similar to asset component 110 (shown in FIG. 1 and described herein).

At an operation 206, ownership of the asset is recorded as being owned by the first user. In some embodiments, operation 206 is performed by a recording component the same as or similar to recording component 112 (shown in FIG. 1 and described herein).

At an operation 208, the first portion of the benefit is distributed to the first user, responsive to a verification that the first user owns the asset. In some embodiments, operation 208 is performed by a distribution component the same as or similar to distribution component 114 (shown in FIG. 1 and described herein).

At an operation 210, the ownership of the asset is transferred to a second user. In some embodiments, operation 210 is performed by a transfer component the same as or similar to transfer component 118 (shown in FIG. 1 and described herein).

At an operation 212, the ownership of the asset is recorded as being owned by the second user. In some embodiments, operation 212 is performed by a recording component the same as or similar to recording component 112 (shown in FIG. 1 and described herein).

At an operation 214, the second portion of the benefit is distributed to the second user, responsive to a second verification that the second user owns the asset. In some embodiments, operation 214 is performed by a distribution component and/or a verification component the same as or similar to distribution component 114 and/or verification component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for sharing benefits in affiliations of users of an online gaming platform, wherein the users include a first user, wherein the first user has a first user account within the online gaming platform, wherein the first user account includes a first inventory of in-game virtual items that are usable within the online gaming platform, the method comprising:

storing, in electronic storage, the affiliations of the users of the online gaming platform, wherein the affiliations include a first affiliation, wherein the first affiliation has a membership including a set of members that have voluntarily elected to be included in the membership, wherein inclusion in the membership persists beyond logging out of and logging into the online gaming platform, wherein the set of members includes a first user, and wherein inclusion in the membership confers a beneficiary right to at least part of a benefit for a subset of the members, wherein the benefit includes a first portion and a second portion that are usable within the online gaming platform;

creating an asset that represents the beneficiary right;

recording ownership of the asset as being owned by the first user through a first transaction recorded on a decentralized database that implements a distributed ledger, wherein the distributed ledger is a blockchain;

distributing the first portion of the benefit to the inventory of the first user account of the first user, responsive to a verification that the first user owns the asset, wherein the verification includes analyzing previously-recorded transactions on the blockchain, wherein the previously-recorded transactions pertain to the asset;

transferring the ownership of the asset to a second user, wherein the second user has a second user account within the online gaming platform, wherein the second user account includes a second inventory of in-game virtual items that are usable within the online gaming platform;

recording the ownership of the asset as being owned by the second user through a second transaction recorded on the blockchain; and distributing the second portion of the benefit to the inventory of the second user account of the second user, responsive to a second verification that the second user owns the asset, wherein the second verification includes analyzing the previously-recorded transactions on the blockchain that pertain to the asset.

2. The method of claim 1, wherein the set of members of the first affiliation do not form a social network, wherein the set of members of the first affiliation form an alliance within the online gaming platform, wherein the alliance enables a type of collaboration that is not available between different users that are not members of the same affiliation.

3. The method of claim 1, wherein the set of members of the first affiliation are not related within a social network, wherein the set of members of the first affiliation are related within one or both of a guild or an alliance.

4. The method of claim 1, wherein prior to the first user being included in the set of members of the first affiliation, the method comprises:

transferring, to the first user, an invitation to become a member of the set of members of the first affiliation, wherein the invitation is transferred upon request by an existing member of the set of members of the first affiliation;

receiving, from the first user, an acceptance to the invitation; and effectuating inclusion of the first user in the set of members of the first affiliation in accordance with the acceptance.

5. The method of claim 1, wherein distribution of the first and second portions of the benefit are triggered by predetermined occurrences of one or more given events within the online gaming platform.

6. The method of claim 1, wherein the ownership of the asset by the first user corresponds with ownership of a given virtual item by the first user within the online gaming platform, wherein the ownership of the given virtual item is implemented by including the given virtual item in the first inventory of in-game virtual items of the first user account.

7. The method of claim 1, wherein transferring the ownership of the asset to the second user is responsive to a purchase by the second user of the asset, wherein the purchase includes the second transaction that is recorded on the blockchain, and wherein transferring the ownership of the asset to the second user includes associating an address with the asset, wherein the address is associated with the second user account.

8. A system configured to share benefits in affiliations of users of an online gaming platform, wherein the users include a first user, wherein the first user has a first user account within the online gaming platform, wherein the first user account includes a first inventory of in-game virtual items that are usable within the online gaming platform, the system comprising:

electronic storage configured to electronically store information, wherein the information includes the affiliations of the users of the online gaming platform, wherein the affiliations include a first affiliation, wherein the first affiliation has a membership including a set of members that have voluntarily elected to be included in the membership, wherein inclusion in the membership persists beyond logging out of and logging into the online gaming platform, wherein the set of members includes a first user, and wherein inclusion in the membership confers a beneficiary right to at least part of a benefit for a subset of the members, wherein the benefit includes a first portion and a second portion that are usable within the online gaming platform; and one or more hardware processors configured by machine-readable instructions to:

create an asset that represents the beneficiary right;

record ownership of the asset as being owned by the first user through a first transaction recorded on a decentralized database that implements a distributed ledger, wherein the distributed ledger is a blockchain;

distribute the first portion of the benefit to the inventory of the first user account of the first user, responsive to a verification that the first user owns the asset, wherein the verification includes analyzing previously-recorded transactions on the blockchain, wherein the previously-recorded transactions pertain to the asset;

transfer the ownership of the asset to a second user, wherein the second user has a second user account within the online gaming platform, wherein the second user account includes a second inventory of in-game virtual items that are usable within the online gaming platform;

record the ownership of the asset as being owned by the second user through a second transaction recorded on the blockchain; and distribute the second portion of the benefit to the inventory of the second user account of the second user, responsive to a second verification that the second user owns the asset, wherein the second verification includes analyzing the previously-recorded transactions on the blockchain that pertain to the asset.

9. The system of claim 8, wherein the set of members of the first affiliation do not form a social network, wherein the set of members of the first affiliation form an alliance within the online gaming platform, wherein the alliance enables a type of collaboration that is not available between different users that are not members of the same affiliation.

10. The system of claim 8, wherein the set of members of the first affiliation are not related within a social network, wherein the set of members of the first affiliation are related within one or both of a guild or an alliance.

11. The system of claim 8, wherein prior to the first user being included in the set of members of the first affiliation, the one or more hardware processors are further configured to:

- transfer, to the first user, an invitation to become a member of the set of members of the first affiliation, wherein the invitation is instructed to be transferred by an existing member of the set of members of the first affiliation;
- receive, from the first user, an acceptance to the invitation; and
- effectuate inclusion of the first user in the set of members of the first affiliation in accordance with the acceptance.

12. The system of claim 8, wherein distribution of the first and second portions of the benefit are triggered by predetermined occurrences of one or more given events within the online gaming platform.

13. The system of claim 8, wherein the ownership of the asset by the first user corresponds with ownership of a given virtual item by the first user within the online gaming platform, wherein the ownership of the given virtual item is implemented by including the given virtual item in the first inventory of in-game virtual items of the first user account.

14. The system of claim 8, wherein transferring the ownership of the asset to the second user is responsive to a purchase by the second user of the asset, wherein the purchase includes the second transaction that is recorded on the blockchain, and wherein transferring the ownership of the asset to the second user includes associating an address with the asset, wherein the address is associated with the second user account.

* * * * *